United States Patent
Kaushansky

(10) Patent No.: US 10,298,622 B2
(45) Date of Patent: May 21, 2019

(54) SYSTEM AND METHOD FOR PASSIVE DECODING OF SOCIAL NETWORK ACTIVITY USING REPLICA DATABASE

(71) Applicant: Verint Systems Ltd., Herzelia, Pituach (IL)

(72) Inventor: Amir Kaushansky, Herzelia (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 512 days.

(21) Appl. No.: 13/953,117

(22) Filed: Jul. 29, 2013

(65) Prior Publication Data

US 2014/0095700 A1    Apr. 3, 2014

(30) Foreign Application Priority Data

Jul. 29, 2012   (IL) .......................................... 221176

(51) Int. Cl.
*H04L 12/26* (2006.01)
*H04L 29/06* (2006.01)
*H04L 29/08* (2006.01)

(52) U.S. Cl.
CPC .............. *H04L 63/30* (2013.01); *H04L 43/08* (2013.01); *H04L 63/302* (2013.01);
(Continued)

(58) Field of Classification Search
CPC ........ H04B 17/00; H04B 17/10; H04B 17/30; H04L 41/00; H04L 43/00; H04L 43/04;
(Continued)

(56) References Cited

U.S. PATENT DOCUMENTS 5,689,442 A    11/1997 Swanson et al.
RE36,918 E  *  10/2000 Micali .............................. 380/30
(Continued)

OTHER PUBLICATIONS

Protecting the Public in a Changing Communications Environment—Apr. 27, 2009—Smith.*
(Continued)

*Primary Examiner* — Tauqir Hussain
*Assistant Examiner* — Boris D Grijalva Lobos
(74) *Attorney, Agent, or Firm* — Meunier Carlin & Curfman LLC

(57) ABSTRACT

Methods and systems for obtaining reconstructing activities of target users in social networks, such as for decoding and displaying social network sessions held by a target user, or identifying other users who are associated with the target user. This analysis is typically carried out based on passive monitoring of network traffic. A social network decoding system constructs and maintains a replica database, which mimics a portion of the user profile database maintained by the social network servers. The social network decoding system monitors network traffic between users and social network servers. Based on the monitored traffic, the system gradually constructs a replica database that attempts to replicate a portion of the social network user profile database, relating to one or more predefined target users. Using the replica database, the system is able to correlate loosely-coupled information objects, events and interactions between the target users and social network pages.

5 Claims, 2 Drawing Sheets

(52) U.S. Cl.
CPC .......... *H04L 63/304* (2013.01); *H04L 63/306* (2013.01); *H04L 63/308* (2013.01); *H04L 67/1095* (2013.01); *H04L 67/22* (2013.01); *H04L 67/306* (2013.01)

(58) Field of Classification Search
CPC ....... H04L 43/045; H04L 43/08; H04L 63/00; H04L 63/14–63/1425; H04L 63/30–63/308; G06F 11/00; G06F 11/30–11/3024; G06F 11/3048; G06F 11/3065; G06F 11/3072; G06F 11/3086; G06F 15/00; G06F 15/16
See application file for complete search history.

(56) References Cited

U.S. PATENT DOCUMENTS

| | | | |
|---|---|---|---|
| 6,404,857 | B1 | 6/2002 | Blair et al. |
| 6,718,023 | B1 | 4/2004 | Zolotov |
| 6,757,361 | B2 | 6/2004 | Blair et al. |
| 7,155,428 | B1* | 12/2006 | Brown et al. |
| 7,216,162 | B2 | 5/2007 | Amit et al. |
| 7,366,759 | B2* | 4/2008 | Trevithick ............ H04L 12/588 709/206 |
| 7,466,816 | B2 | 12/2008 | Blair |
| RE40,634 | E | 2/2009 | Blair et al. |
| 7,587,041 | B2 | 9/2009 | Blair |
| 7,801,971 | B1* | 9/2010 | Amidon et al. ............. 709/217 |
| 8,074,267 | B1* | 12/2011 | Stimpson ..................... 726/13 |
| 8,171,128 | B2* | 5/2012 | Zuckerberg et al. ......... 709/224 |
| 8,588,111 | B1* | 11/2013 | Kridlo .............. H04M 3/42221 370/259 |
| 8,656,284 | B2* | 2/2014 | Ivanyi .................... G06Q 30/02 715/736 |
| 8,665,728 | B2* | 3/2014 | Altman ......................... 370/241 |
| 8,681,640 | B2* | 3/2014 | Horovitz ....................... 370/242 |
| 8,909,792 | B2* | 12/2014 | Cooper et al. ................ 709/227 |
| 8,918,851 | B1* | 12/2014 | Iannamico ....................... 726/7 |
| 2002/0116512 | A1* | 8/2002 | Amit et al. .................... 709/230 |
| 2004/0143753 | A1* | 7/2004 | Hernacki et al. ............. 713/200 |
| 2008/0014873 | A1 | 1/2008 | Krayer et al. |
| 2008/0261192 | A1 | 10/2008 | Huang et al. |
| 2008/0285464 | A1 | 11/2008 | Katzir |
| 2009/0271520 | A1* | 10/2009 | Siddiqui ....................... 709/227 |
| 2009/0290492 | A1* | 11/2009 | Wood et al. .................. 370/235 |
| 2009/0290501 | A1* | 11/2009 | Levy et al. ................... 370/250 |
| 2010/0036936 | A1* | 2/2010 | Cox et al. .................... 709/223 |
| 2010/0235489 | A1* | 9/2010 | Cogan ......................... 709/224 |
| 2010/0268830 | A1* | 10/2010 | McKee et al. ................ 709/228 |
| 2010/0281044 | A1* | 11/2010 | Gupta et al. .................. 707/767 |
| 2011/0113086 | A1* | 5/2011 | Long et al. ................... 709/203 |
| 2011/0119593 | A1* | 5/2011 | Jacobson et al. ............. 715/736 |
| 2011/0208814 | A1* | 8/2011 | Bostrom et al. .............. 709/204 |
| 2011/0238723 | A1* | 9/2011 | Weintraub et al. ........... 709/201 |
| 2011/0276396 | A1* | 11/2011 | Rathod ....................... 705/14.49 |
| 2011/0276689 | A1* | 11/2011 | Rosen ........................... 709/224 |
| 2011/0307434 | A1* | 12/2011 | Rostampour et al. .......... 706/45 |
| 2011/0314048 | A1* | 12/2011 | Ickman et al. ................ 707/769 |
| 2012/0124202 | A1* | 5/2012 | Cooper et al. ................ 709/224 |
| 2012/0185474 | A1* | 7/2012 | Hansen ............... G06F 17/3087 707/728 |
| 2013/0150087 | A1* | 6/2013 | Kosuru et al. ............. 455/456.3 |
| 2013/0185654 | A1* | 7/2013 | Harris et al. .................. 715/753 |
| 2014/0019457 | A1* | 1/2014 | Xie ............................... 707/741 |
| 2014/0122473 | A1* | 5/2014 | Fletcher et al. .............. 707/732 |

OTHER PUBLICATIONS

Honeybot Your Man in the Middle for Automated Social Engineering—Apr. 6, 2010—Lauinger et al.*
Shalita et al. (A Powerful Tool for Fraud & Security Investigators_Real-Time Packet-to-Event Translation—2012).*
Tan (3 Basic Elements to Network Forensics Solutions—Aug. 2010).*
Valeur et al. (A Comprehensive Approach to Intrusion Detection Alert Correlation—Sep. 2004).*
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "Integrated Digital Audio Software R&S AllAudio," Specifications, 8 pages.
Metronome SSL Inspector Solution Overview White Paper, "Examining SSL-encrypted Communications," 2010, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fox Replay BV, "FoxReplay Analyst," http//www.foxreplay.com, Revision 1.0, Nov. 2007, 5 pages.
Fox-IT BV, "FoxReplay Analyst," Product Brochure, http//www.foxreplay.com, 2 pages.
Aho, Alfred V., et al., "Efficient String Matching: An Aid to Bibliographic Search," Communication of the ACM, Jun. 1975, vol. 18, No. 6, pp. 333-340.
Coffman, T., et al., "Graph-Based Technologies for Intelligence Analysis," CACM, Mar. 2004, 12 pages.
Cloudshield, Inc., "Lawful Intercept Next-Generation Platform," 2009, 6 pages.
Goldfarb, Eithan, "Mass Link Analysis: Conceptual Analysis," 2006, Version 1.1, 21 pages.
Verint Systems Inc., "Mass Link Analysis: Solution Description," Dec. 2008, 16 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Schulzrinne, H., et al., "RTP: A Transport Protocol for Real-Time Applications," Standards Track, Jul. 2003, 89 pages.
Sheng, Lei, "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Svenson, Pontus, "Social network analysis and information fusion for anti-terrorism," CIMI, 2006, 8 pages.
Tongaonkar, Alok S., "Fast Pattern-Matching Techniquest for Packet Filtering," Stony Brook University, May 2004, 44 pages.
Yu, Fang, et al., "Fast and Memory-Efficient Regular Expression Matching for Deep Packet Inspection," ANCS'06, Dec. 3-5, 2006, San Jose, California, 10 pages.

(56) References Cited

OTHER PUBLICATIONS

Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

SYSTEM AND METHOD FOR PASSIVE DECODING OF SOCIAL NETWORK ACTIVITY USING REPLICA DATABASE

FIELD OF THE DISCLOSURE

The present disclosure relates generally to Web intelligence, and particularly to methods and systems for analyzing social network activity.

BACKGROUND OF THE DISCLOSURE

In recent years, social networks such as Facebook, Twitter, LinkedIn, YouTube and others have become a popular scene for interaction between network users. These social networks accumulate large amounts of information regarding the users and the interactions between them. As such, social networks can be used for obtaining valuable information regarding target users.

SUMMARY OF THE DISCLOSURE

An embodiment that is described herein provides a method including monitoring communication between one or more users of a communication network and one or more servers of a social network that maintains a user profile database. A replica database is constructed based on the monitored communication. The replica database replicates a portion of the user profile database relating to one or more predefined target users. Activity of a target user in the social network is reconstructed using the monitored communication and the replica database.

In some embodiments, constructing the replica database includes establishing a correlation between first and second information objects extracted from the monitored communication, and reconstructing the activity includes deducing the activity of the target user from the correlation. Establishing the correlation may include correlating a page of the social network with a response made to an element of the page. Additionally or alternatively, establishing the correlation may include correlating first and second objects posted at different times on a page of the social network.

In an embodiment, reconstructing the activity includes reconstructing one or more sessions conducted by the target user in the social network. In another embodiment, reconstructing the activity includes reconstructing one or more links of the target user with respective other users of the social network. In a disclosed embodiment, monitoring the communication includes passively receiving the communication without affecting the communication network or the social network.

In some embodiments, reconstructing the activity includes detecting an event related to the activity of the target user in the social network, and outputting an indication of the event. Detecting the event may include detecting, using the replica database, that the target user deleted a contact from his list of contacts. In another embodiment, detecting the event may include detecting, using the replica database, a new comment that is added to a given information object.

There is additionally provided, in accordance with an embodiment that is described herein, apparatus including a network interface and a processing unit. The network interface is configured to monitor communication between one or more users of a communication network and one or more servers of a social network that maintains a user profile database. The processing unit is configured to construct, based on the monitored communication, a replica database that replicates a portion of the user profile database relating to one or more predefined target users, and to reconstruct activity of a target user in the social network using the monitored communication and the replica database.

The present disclosure will be more fully understood from the following detailed description of the embodiments thereof, taken together with the drawings in which:

DETAILED DESCRIPTION OF EMBODIMENTS

Overview

Figure 1:
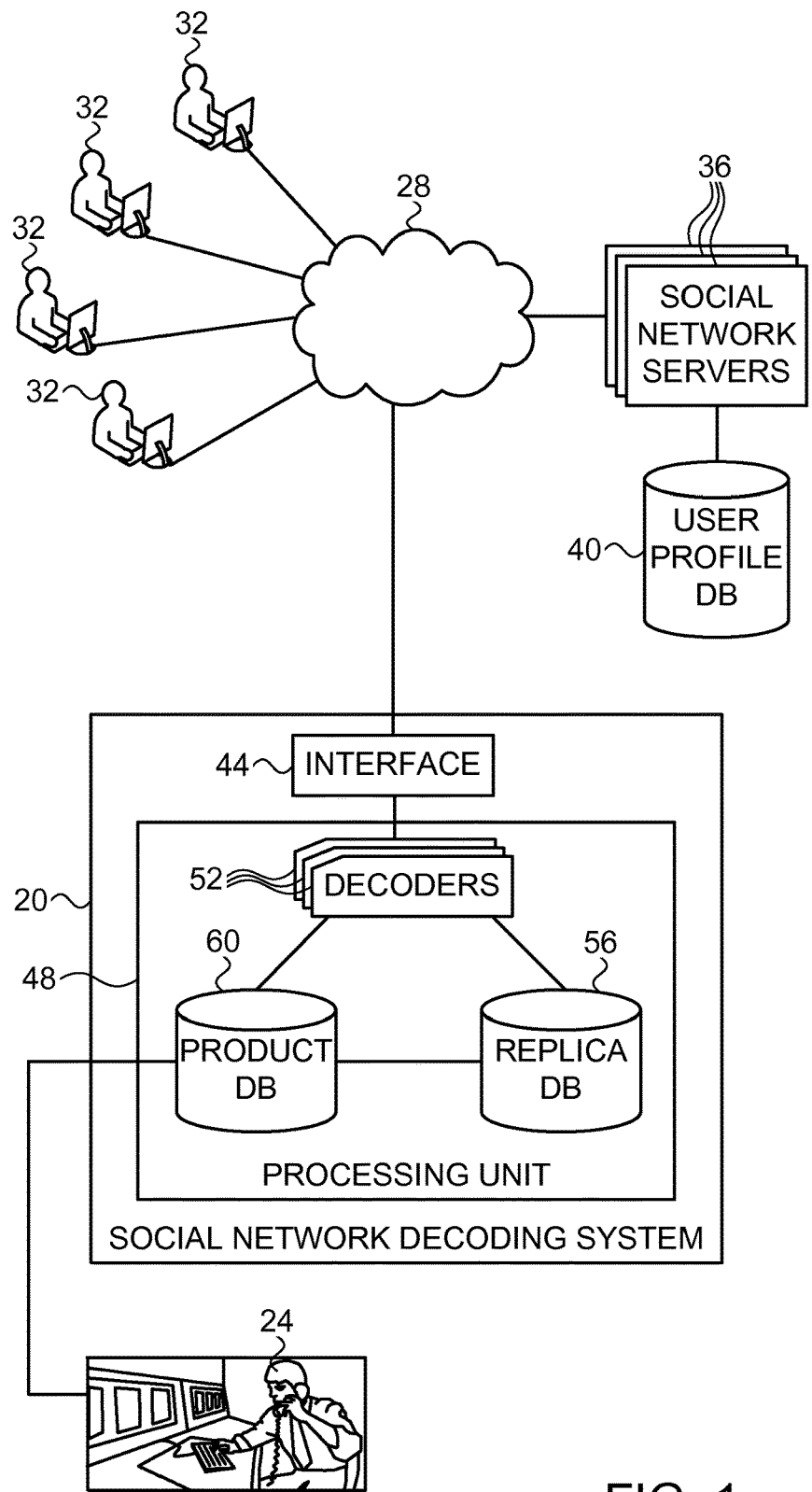
FIG. 1 is a block diagram that schematically illustrates a system for decoding social network activity, in accordance with an embodiment that is described herein.

Embodiments that are described herein provide improved methods and systems for obtaining valuable information regarding target users from social networks. The disclosed methods and systems can be used, for example, for reconstructing activities of target users in social networks, such as for decoding and displaying social network sessions held by a target user, or identifying other users who are associated with the target user. This analysis is typically carried out based on passive monitoring of network traffic.

Communication traffic in a social network has unique characteristics that present a challenge to information gathering and analysis. For example, the time scale over which monitoring and analysis should be performed is often large. The correlation between communication interactions of a given target user may be loose and hard to establish based on the communication traffic alone.

Consider, for example, a scenario in which a target user browses a certain social network page. At a later point in time, possibly days after the initial browsing, the target user comments on a certain event or responds to some component of the same social network page. Even if the communication traffic of both interactions is intercepted in full, it is extremely difficult to correlate them and reconstruct the complete session of the target individual with the page, because of the large time gap between the interactions.

In some embodiments that are described herein, a social network decoding system overcomes these challenges by constructing and maintaining a replica database, which mimics a portion of the user profile database maintained by the social network servers. Typically, the social network servers maintain a database of user profiles, which stores information such as the users' pages, personal information, communication interactions, and/or association with other users (sometimes nicknamed "friends," "contacts," "links," "connections" or "followers").

The social network decoding system monitors network traffic between users and social network servers. Based on the monitored traffic, the system gradually constructs a replica database that attempts to replicate a portion of the social network user profile database, relating to one or more predefined target users.

Using the replica database, the system is able to correlate loosely-coupled information objects, events and interactions between the target users and social network pages. Using this correlation, the system can later reconstruct activities of target users in the social network. The reconstructed target user activity can be used, for example, for decoding and displaying entire sessions held by target users in the social network, or for identifying other users who are connected to the target users. The system is typically passive, i.e., carries out the activity reconstruction processes based on passive monitoring of network traffic without intervening or affecting the communication network or the social network in any way.

In other words, the disclosed techniques establish correlations between information objects of social network pages (e.g., posts, comments, contact lists or images). Such correlations are hard to establish when the information objects are obtained by passive traffic monitoring and not by actively accessing the social network Web site. In the disclosed embodiments, correlations between such objects are found using the replica database, as will be explained below. The established correlations can then be used to track the social network activities of target users.

It is possible in principle to track the activities of target users in a social network using active, open source intelligence techniques that collect information directly from the social network site. The passive, interception-based techniques described herein have distinct advantages over active open source techniques. For example, the disclosed techniques enable law enforcement agencies to show the exact time at which a target user saw or wrote specific information.

As another example, the disclosed techniques are able to access social network pages that are defined as private, as well as user groups or forums that are defined as private. Such private information is not accessible to active open source techniques. As yet another example, the disclosed techniques are unaffected by target users who use aliases instead of real names to hide their social network activities.

System Description

FIG. 1 is a block diagram that schematically illustrates a system 20 for decoding social network activity, in accordance with an embodiment that is described herein. System 20 monitors network communication traffic in a passive manner, and reconstructs social network activities and contacts of target users using techniques that are described below. The reconstructed social network activities are presented to an operator 24. Systems of this sort may be used, for example, by government and law enforcement agencies.

System 20 is connected to a communication network 28, typically the Internet, for monitoring communication traffic that is exchanged over the network. In particular, system 20 monitors traffic that is exchanged between network users 32 and servers 36 of a social network. The social network in question may comprise, for example, Facebook, Twitter, LinkedIn, Google+, YouTube, or any other suitable social network application.

Typically, the social network servers maintain a user profile database 40. For each user of the social network, database 40 stores information such as the user pages, personal information, communication interactions of the user, a list of contacts (sometimes nicknamed "friends," "links," "connections" or "followers") of the user with other users, sent and received contact requests, user preferences, user location, images, affiliation of the user with affiliation groups, updates or modifications performed in the user profile over time, interactions of the user with various social network pages and/or any other suitable information.

In the example configuration of FIG. 1, system 20 comprises an interface 44 for monitoring the network traffic, and a processing unit 48 that carries out the disclosed techniques. Interface 44 may comprise, for example, a passive network probe that intercepts traffic from network 28. Interface 44 typically also applies some filtering to the monitored traffic, e.g., retains only the traffic related to the social network, to certain target users, to certain servers, and/or to certain IP addresses. The traffic that is intercepted by interface 44, typically Internet Protocol (IP) packets, is provided to unit 48 for processing.

Processing unit 48 comprises one or more decoders 52 that extract and decode various content elements from the monitored traffic. When a user browses a social network page, for example, then entire content of the page is transferred over the network. Decoders 52 decode the page content elements. When a user responds or comments on a certain element of a social network page, decoders 52 identify and decode this response.

In an example implementation, decoders 52 break the Web pages into individual objects such as posts, comments, contact lists, images and other suitable object types. Every object in a page is assigned an 'object ID', which is associated with the 'user ID' of both the user who posted the object and the user on whose page the object was posted. When an object on a page relates to another object on the page, such as a comment to another post, the object ID is also associated with the object Id of the object to which it relates. Typically, the object IDs used by decoders 52 are the same object IDs used by the social network servers.

Processing unit 48 comprises a replica database 56, which aims to replicate a portion of user profile database 40 of the social network. Typically, database 40 is not accessible to system 20, and it is only available for internal use by servers 36 of the social network. Thus, processing unit attempts to replicate a portion of database 40 that relates to a predefined list of target users of interest.

For each target user, replica database 56 stores similar content as database 40 for each target user, e.g., user pages, personal information, communication interactions of the user, a list of contacts of the user with other users, sent and received contact requests, user preferences, user location, images, affiliation of the user with affiliation groups, updates or modifications performed in the user profile over time, interactions of the target user with various social network pages (e.g., "LIKEs" and addition of content to pages), and/or any other suitable information.

Processing unit 48 constructs and maintains replica database 56 based on the monitored network traffic. For example, when a target user browses a certain social network page, the page content is transferred over network 28. Interface 44 intercepts the traffic that carries the page, decoders 52 decode the page and processing unit 48 stores the page in replica database 56. When the target user later comments on a certain component of this page, the comment is intercepted and decoded by interface 44 and decoders 52, and processing unit 48 stores this comment in the replica database.

As explained above, decoders 52 break the page into individual information objects. Each object has a unique object ID (which is typically the same ID used by social network servers 36). For each object, unit 48 stores in the replica database a list of identifiers of the user who placed the object, the user on whose wall the object was placed, object IDs of related objects, and other related information such the time and date at which the object was placed, the time and date at which the object was intercepted, location information, IP address of the users, and/or any other suitable information.

Processing unit 48 finds correlations between objects based on the information stored in the replica database, such as the object IDs and user IDs. The correlation between object IDs enables, for example, tracking the sequence of comments to a given information object. Correlation between user IDs, for example, provides information about communication between users. Cross correlating the communication sequence and links between users provides information about the strength of the relationship between the users.

The process of updating the replica database by unit 48 continues over time and resembles the process of updating database 40 by servers 36. Gradually, replica database 56 becomes a reliable replica of the relevant portion of database 40. Using this process, processing unit 48 overcomes its inability to access database 40. Replica database 56 is typically several orders of magnitude smaller than database 40, since it stores information that is focused on a list of target users—only a fraction of the total user population of the social network.

In some embodiments, replica database 56 holds the stored information for a relatively long but limited period of time, e.g., between one and four weeks. This time period may be set to the same order of magnitude as the time period of user browser caching. The rationale is that if the user browser does not cache certain information, then it will have to download the full page again, in which case the new download transaction will be intercepted.

Processing unit 48 further comprises a product database 60, which stores information products that are produced by processing unit 48 using replica database 56. Products may comprise, for example, reconstructed sessions of a target user in the social network, identified links of a target user with other users, and/or any other suitable product that can provide valuable information to operator 24. For example, processing unit 48 may reconstruct the wall story of a target user regardless of the long period of time over which the wall story was created.

In some cases, the communication traffic monitored by system 20 is encrypted, for example using an encryption protocol such as Secure Socket Layer (SSL) or Transport Layer Security (TLS). In some embodiments, processing unit 48 decrypts the encryption protocol using Man-In-The-Middle (MITM) techniques in order to enable processing in accordance with the disclosed techniques. MITM techniques are described, for example, in U.S. patent application Ser. No. 13/446,338, entitled "System and method for selective inspection of encrypted traffic," filed Apr. 13, 2012, which is assigned to the assignee of the present patent application and whose disclosure is incorporated herein by reference.

The system configuration of system 20 shown in FIG. 1 is an example configuration, which is chosen purely for the sake of conceptual clarity. In alternative embodiments, any other suitable system configuration can also be used. For example, system 20 may monitor traffic of more than one social network (e.g., both Facebook and Twitter), construct respective replica databases for the monitored social networks, and extract and correlate information regarding target users who are active in the different social networks.

The elements of system 20, such as processing unit 48, may be implemented in hardware, in software, or using a combination of hardware and software elements. Databases 56 and 60 may be implemented using any suitable storage devices, such as solid state or magnetic disks. In some embodiments, certain functions of system 20 can be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Social Network Decoding Using Replica Database

Figure 2:
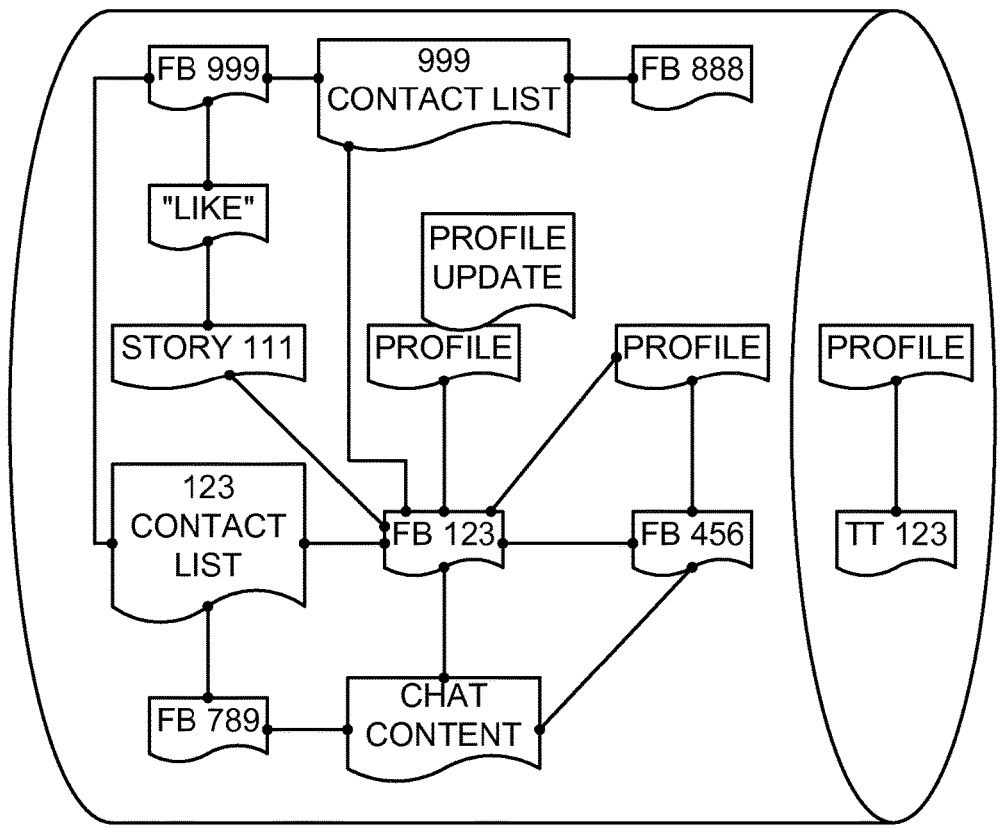
FIG. 2 is a diagram showing an example model of data extracted from social networks, in accordance with an embodiment that is described herein.

FIG. 2 is a diagram showing an example model of data extracted from social networks, in accordance with an embodiment that is described herein. Data models of this sort can be constructed by system 20 in replica database 56. As explained above, the data model represents correlations between information objects of social network pages that are established by system 20. The example of FIG. 2 shows several Facebook target users (FB123, FB456, FB789, FB888 and FB999) and a Twitter target user (TT123). At least some of the users are associated with respective profiles and possibly profile updates.

The information regarding target user FB999 comprises the target user's contact list ("999 CONTACT LIST"), which indicates that target users FB123, FB888 are connected to FB999. Similarly, the contact list of target user FB123 indicates that target users FB789 and FB999 are connected to FB123. The data model also comprises the wall story of a target user FB111, and indicates that target user FB999 responded with a "LIKE" to this wall story, and that target user FB123 is connected to this wall story.

The data model also indicates that, based on monitored chat content over the social network, target users FB123, FB789 and FB456 are connected to one another since they interact via this chat.

Figure 3:
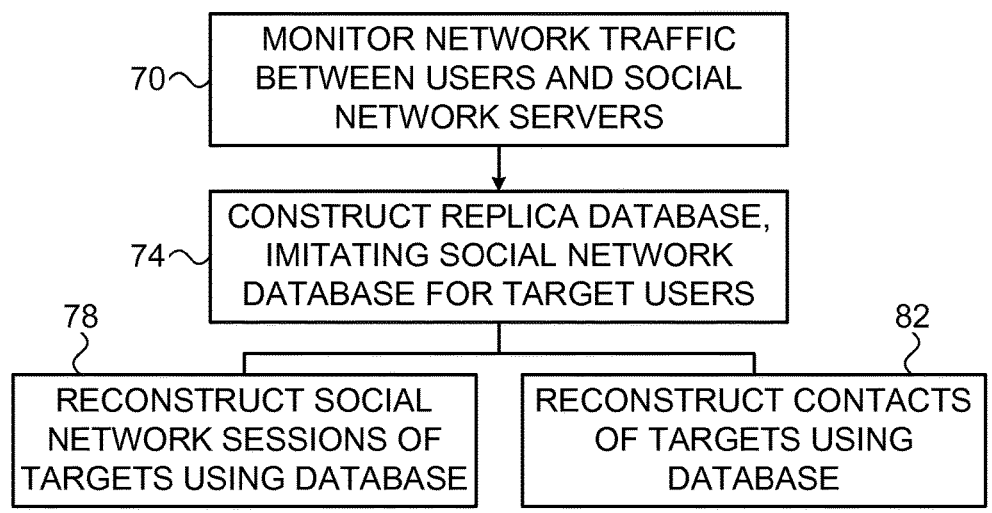
FIG. 3 is a flow chart that schematically illustrates a method for decoding social network communication, in accordance with an embodiment that is described herein.

FIG. 3 is a flow chart that schematically illustrates a method for decoding social network communication, in accordance with an embodiment that is described herein. The method begins with interface 44 of system 20 monitoring traffic communication between users 32 and social network severs 36 over network 28, at a monitoring step 70.

Processing unit 48 constructs replica database 56, at a replica construction step 74. The replica database imitates the portion of user profile database 40 of the social network that is related to one or more predefined target users.

Based on the replica database, processing unit 48 reconstructs sessions of target users in the social network, at a session reconstruction step 78. Additionally or alternatively, processing unit 48 uses the replica database to reconstruct links or contacts of the target users with one another and/or with other users, at a link analysis step 82.

Certain events related to the reconstructed sessions or links may have considerable value for operator 24. In some embodiments, processing unit 48 detects such events and alerts the operator accordingly. For example, deletion of a contact from a target user's may comprise a strong indication of an attempt to hide an illegitimate activity or association. As another example, processing unit 48 may generate an alert upon detecting a new comment that is added to an information object (e.g., post) that was previously marked by operator 24 (e.g., analyst). Assume, for example, that a suspect target user wrote a post about a certain location. The analyst that reviews the intercepted traffic marks this post. If one of the suspect's contacts comment about this post, unit 48 detects the new comment and alerts the analyst.

Although the embodiments described herein mainly address gathering information on target users, the principles of the present disclosure can also be used for other purposes. For example, financial institutions and other enterprises are required by regulatory bodies to log all external communication of employees, and store the communication for several years. This information can be used later in case of investigation or commercial dispute. Solutions of this sort are offered, for example, by Actiance, Inc. (Belmont, Calif.) and Dell SonicWall (San Jose, Calif.). The disclosed techniques can be used for analyzing such information.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for detecting suspicious social network activities of a target user, the method comprising:
   providing a social network decoding system that is communicatively coupled to a network that conveys network traffic between a plurality of users and servers of a social network;
   monitoring, using a passive network probe of the social network decoding system, the network traffic between the plurality of users and the social network;
   filtering the monitored network traffic to retain only network traffic related to the target user;
   extracting one or more information objects corresponding to interactions between the target user and other users on the social network from the filtered network traffic;
   adding the one or more information objects to a replica database;
   repeating the monitoring, extracting, and adding for other sessions over a period of weeks to update the replica database with additional information objects corresponding to interactions between the target user and other users on the social network;
   correlating information objects in the replica database;
   constructing a data model based on the correlations, wherein the data model indicates relationships between the target user and other users of the social network;
   detecting, after the construction of the data model, a change in the relationship between the target user and one of the related other users of the social network, wherein the detecting comprises determining a strength of the relationship between the target users and the one of the related other users of the social network, the strength based on interactions between the target user and the one of the related other users of the social network, and wherein the change in the relationship comprises a deletion of the one of the related other users of the social network as a contact of the target user; and
   transmitting an alert to an analyst monitoring the activities of the target user without the target user's knowledge and without the social network's knowledge, wherein the alert is based on the detected change in the relationship and comprises an indication of suspicious activities of the target user.

2. The method according to claim 1, wherein the correlating comprises correlating a page of the social network with a response made to an element of the page.

3. The method according to claim 1, wherein the correlating comprises correlating first and second information objects posted at different times on a page of the social network.

4. The method according to claim 1, wherein the network traffic is encrypted and wherein monitoring the network traffic comprises passively receiving the network traffic without actively accessing the social network and decrypting the network traffic.

5. The method according to claim 1, further comprising:
   marking an information object of the target user for monitoring so that an alert is transmitted to the analyst when one of the related other users of the social network interacts with the information object on the social network.

* * * * *